United States Patent [19]

Ito et al.

[11] Patent Number: 4,852,707

[45] Date of Patent: Aug. 1, 1989

[54] REVERSIBLE SELF-LOCKING CLUTCH

[75] Inventors: Kenichiro Ito; Hiromi Nojiri; Kenro Adachi, all of Iwata, Japan

[73] Assignee: NTN Toyo Bearing Co., Ltd., Osaka, Japan

[21] Appl. No.: 241,283

[22] Filed: Sep. 7, 1988

[30] Foreign Application Priority Data

Sep. 8, 1987 [JP] Japan .................. 62-224493

[51] Int. Cl.$^4$ .................. F16D 15/00; F16D 67/00
[52] U.S. Cl. .................. 192/44; 192/7;
192/8 R; 188/134
[58] Field of Search .................. 192/7, 8 R, 44, 45;
188/134

[56] References Cited

U.S. PATENT DOCUMENTS

| | | | |
|---|---|---|---|
| 1,343,410 | 6/1920 | Simpson | 192/8 R |
| 1,385,785 | 7/1921 | Hofer | 192/8 R |
| 2,066,167 | 7/1932 | Swartz | 192/44 X |
| 2,414,341 | 1/1947 | Spraragen | 192/8 R X |
| 2,429,900 | 10/1947 | Spraragen | 192/8 R |
| 2,429,901 | 10/1947 | Spraragen | 192/8 R |
| 2,447,469 | 8/1948 | Spraragen | 192/8 R X |
| 2,449,020 | 9/1948 | Spraragen | 192/8 R |
| 2,475,159 | 7/1949 | Spraragen | 192/8 R |
| 2,559,960 | 7/1951 | Houplain | 192/8 R |
| 2,812,044 | 11/1957 | Cole | 192/8 R |
| 3,232,124 | 2/1966 | Weber | 192/8 R X |
| 3,243,023 | 3/1966 | Boyden | 192/8 R |
| 3,319,747 | 5/1967 | Lauper | 192/8 R |
| 4,177,887 | 12/1979 | Kellett et al. | 192/8 R |
| 4,706,791 | 11/1987 | Magliano | 192/8 R |

Primary Examiner—Leslie A. Braun
Assistant Examiner—Nicholas Whitelaw
Attorney, Agent, or Firm—Armstrong, Nikaido, Marmelstein, Kubovcik & Murray

[57] ABSTRACT

An improved clutch for use with an electric power steering assembly is disclosed. The improved clutch has an outer member, and a cage mounted between the outer and inner members and formed with a plurality of pockets. The improved clutch further comprises a pair of rolling elements mounted in each pocket, and a spring mounted between the rolling elements so as to bias the rolling elements away from each other into wedge-like spaces in the pocket. In the event that an associated driving system fails, the improved clutch of this invention is disconnected from the steering wheel since the outer member coupled to the driving system becomes unlocked from the inner member which is coupled to the steering wheel.

4 Claims, 3 Drawing Sheets

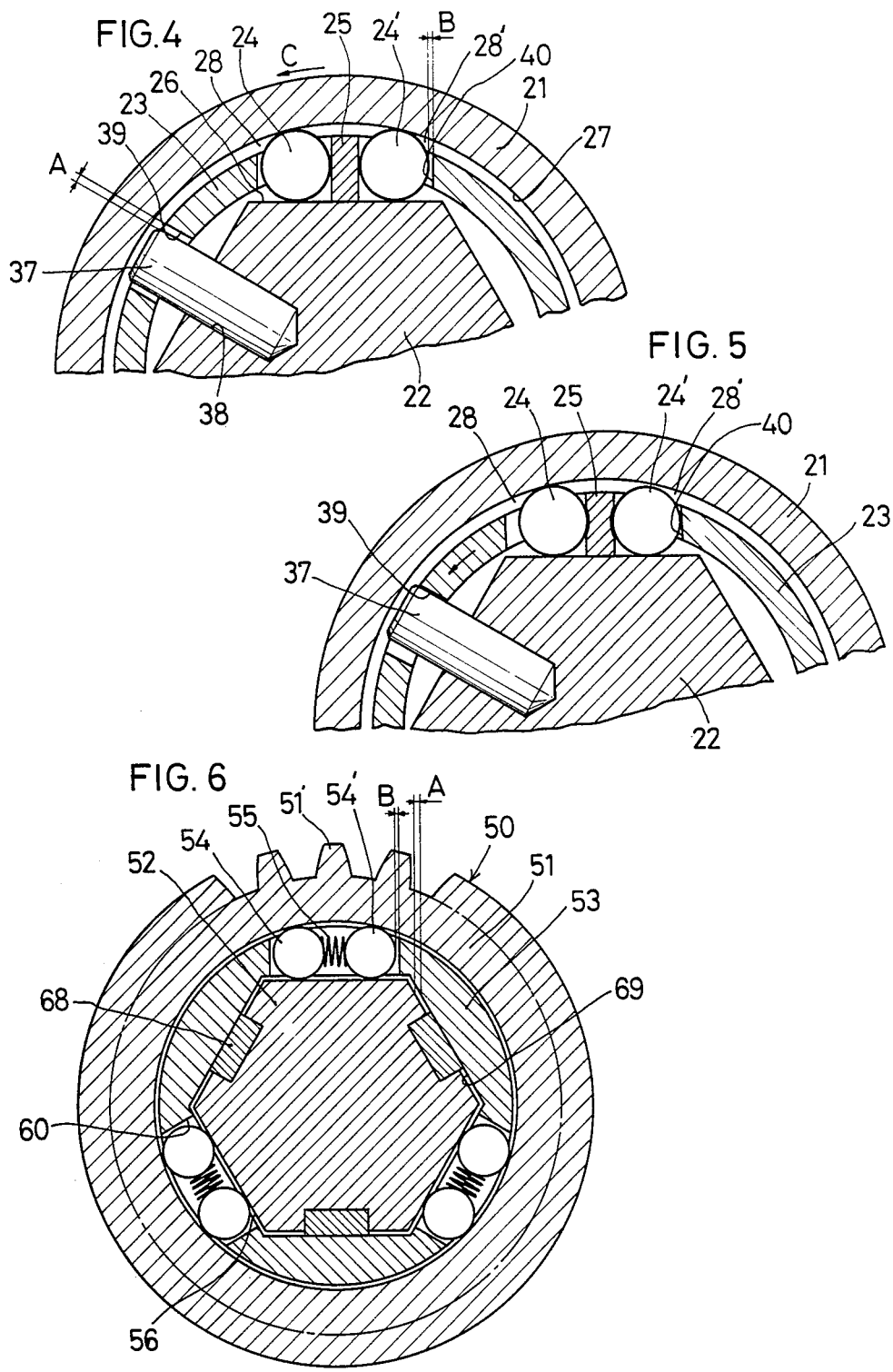

REVERSIBLE SELF-LOCKING CLUTCH

The present invention relates to a clutch suitable for use with e.g. an electric power steering assembly.

A typical prior art electric power steering assembly is shown in FIG. 8. With this type of assembly, a torque sensor 4 is provided which serves to actuate a motor 6 through a control unit 5 upon detection of a torque of a steering shaft 3 generated owing to the resistance of vehicle wheels 2 when a steering wheel 1 is turned in one direction. The motor 6 has its drive shaft coupled to a pinion 8 of the steering shaft 3 through a reduction unit 7. The pinion 8 meshes with a rack 9 connected to the vehicle wheels 2. With this arrangement, since the driving power of the motor 6 is transmitted to the wheels 2, they can be controlled with a very small manual steering force.

But, this type of electric power steering assembly has one drawback that if the driving system including the control unit 5, the motor 6 and the reduction unit 7 should get out of order, the force required to turn the steering wheel 1 will grow too large to steer the vehicle wheels 2. This is because the reduction unit 7 and the motor 6 are still coupled to the steering shaft 3.

As one solution to this problem, it is known to provide a clutch 10 between the reduction unit 7 and the pinion 8. But if an electromagnetic clutch is used, it is necessary to use a rather large-sized one to obtain a required torque. If a claw clutch is used, a rather large force is required to set the clutch in an engaging position and to release it from engagement under loaded conditions.

An object of the present invention is to provide a clutch which obviates the abovesaid shortcomings.

In accordance with the present invention, there is provided a clutch comprising: an outer member; an inner member mounted in the outer member; one of the outer member and the inner member being formed with a cam surface and the other being formed with a cylindrical surface; a cage interposed between the outer member and the inner member and formed with a plurality of pockets angularly spaced from one another; a plurality of pairs of rolling elements mounted in each pocket; a plurality of wedge-like spaces defined by the inner peripheral surface of the outer member and the outer peripheral surface of the inner member and the walls of the pockets formed in the cage; a spring mounted in each pocket between the pair of rolling elements so as to bias the rolling elements away from each other into the wedge-like spaces; and means for causing the cage to engage the one member formed with a cam surface with a first clearance in the direction of rotation; the one member formed with a cam surface being brought into engagement with the other member formed with a cylindrical surface through only one of the pair of rolling elements when the cage moves with respect to the one member formed with a cam surface.

The cage of the clutch is coupled to the first drive shaft. One of the inner member and the outer member formed with the cam surface is coupled to the driven shaft and the other formed with the cylindrical surface is coupled to the second drive shaft. With this arrangement, the inputs from the first and second drive shafts can be mechanically changed over from one to the other without the need for any external control system, to be transmitted to the driven shaft.

When the clutch of the present invention is applied to the electric power steering assembly, one of the inner member and the outer member, that is, one formed with the cam surface is coupled to the pinion shaft and the other formed with the cylindrical surface is coupled to the motor. The cage is coupled to the steering shaft. While the driving system including the motor is in a normal working condition, the pairs of rolling elements are biased by the springs in a direction away from each other into the narrow areas of each wedge space defined between the cam surface and the cylindrical surface formed on the opposite surfaces of the inner member and the outer member. The clutch can operate in either direction, allowing the torque of the outer member to be transmitted to the inner member, or vice versa, to drive the pinion shaft. With this arrangement, the vehicle wheels can be controlled with a very small manual steering force.

In case the driving system fails, the cage will firstly engage and push the rolling elements to release the engagement between the outer member and the inner member, and then the cage engages one of the inner member and the outer member formed with the cam surface and coupled to the pinion shaft. Now, the steering force exerted on the steering wheel is thus applied to the pinion shaft. This is because the clearance formed in the direction of rotation between the cage and the member having the cam surface is larger than the clearances formed in the direction of rotation between the wall of the pocket-shaped space of the cage and the rolling elements. There is no fear that the steering wheel can not be controlled manually in case of the failure of the driving system.

Other features and objects of the present invention will become apparent from the following description taken with reference to the accompanying drawings, in which:

FIG. 4 is an enlarged view of a portion of FIG. 3;

FIG. 5 is a similar view showing another operating condition;

FIG. 6 is a transverse sectional view of the second embodiment;

FIG. 1 shows an electric power steering assembly equipped with the clutch of the first embodiment of the present invention.

Figure 1:
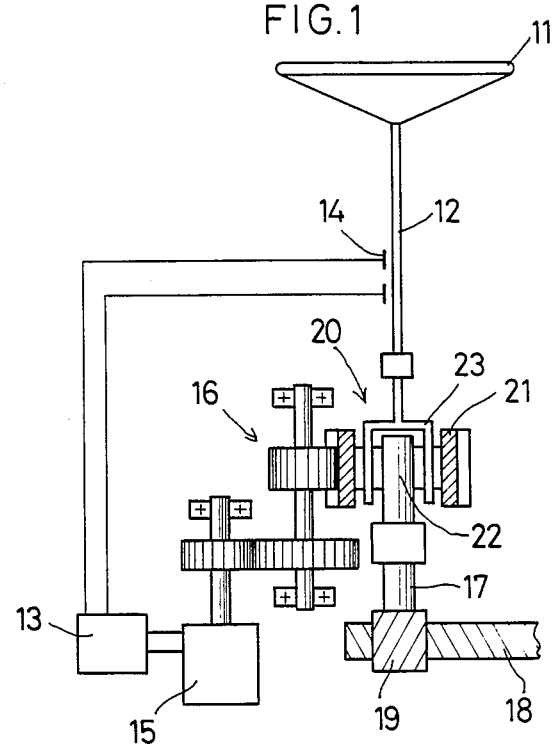
FIG. 1 is a schematic view of an electric power steering assembly in which the clutch according to the present invention is used.

This power steering assembly comprises a steering shaft 12, a steering wheel 11 mounted on the shaft 12, a torque sensor 14 for detecting the torque of the steering shaft 12, a control unit 13 connected to the sensor 14, and a motor 15 adapted to be actuated by the sensor 14 through the control unit 13. The motor 15 has its driving shaft coupled to an outer member 21 of a clutch assembly 20 through a reduction unit 16. The clutch 20 further includes a cage 23 coupled to the steering shaft 12 and an inner member 22 coupled to a pinion shaft 17 having a pinion 19 on the other end and in meshing engagement with a rack 18.

Figure 3:
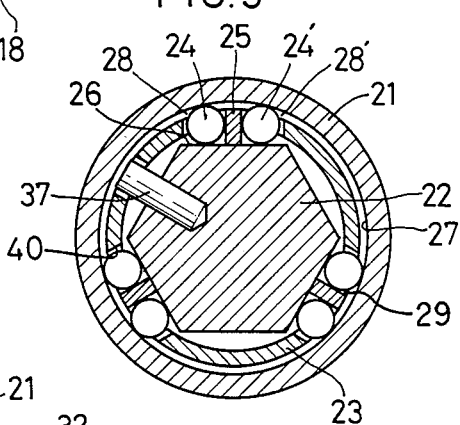
FIG. 3 is a transverse sectional view taken on line 3—3 of FIG. 2.
Figure 2:
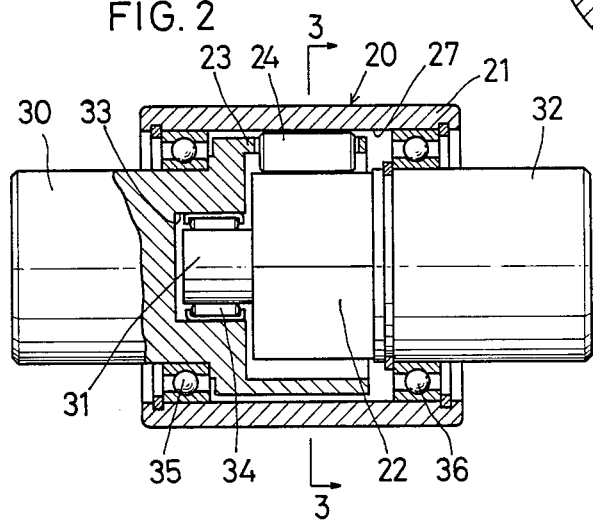
FIG. 2 is a vertical sectional view of the first embodiment of the present invention.

The clutch 20 is shown in more detail in FIGS. 2 and 3. As shown in FIG. 3, the clutch 20 comprises the outer member 21, the inner member 22, the cage 23, rolling elements 24 and 24' and springs 25. The outer member 21 has a cylindrical inner surface 27. The inner member 22 is mounted in the outer member 21 so that its outer polygonal cam surface 26 will be opposed to the cylindrical inner surface 27 of the outer member 21. Between the cylindrical surface 27 and the polygonal cam surface 26, a pair of wedge spaces 28, 28' are defined. In the wedge spaces 28, 28', a pair of rolling elements 24 and 24' are mounted.

A spring 25 is interposed between each pair of rolling elements 24 and 24' so as to bias them away from each other toward the narrow ends of the wedge spaces 28, 28'. The cage 23 is cylindrical and integral with a shank 30 which is coupled with the steering shaft 12. The cage 23 is formed with pockets 29 angularly spaced to receive the rolling elements 24 and 24'. The inner member 22 has its one end integrally formed with a small-diameter shank 31 and the other end integrally formed with a shank 32 adapted to be coupled to the pinion shaft 17 shown in FIG. 1. The small-diameter shank 31 is rotatably received in a bearing 34 mounted in a cylindrical bore 33 formed in the shank 30 of the cage 23. The cage 23 and the inner member 22 are rotatably supported in the outer member 21 through bearings 35 and 36 mounted in the outer member at its both ends.

The cage 23 and the inner member 22 are in engagement with each other through a pin 37. As shown in FIG. 4, the pin 37 is fixedly mounted in a hole 38 formed in the inner member 22 and has its other end loosely received in a hole 39 formed in the cage 23. The clearance A formed between the wall of the hole 39 and the pin 37 is slightly larger than the clearance B formed in the direction of rotation between the pocket surfaces 40 on the cage 23 and the rolling elements 24 and 24'. A gear is mounted on the outer periphery of the outer member 21 so as to mesh with an output gear of the reduction unit 16 shown in FIG. 1.

In operation, when the steering wheel 11 is turned, the steering force is transmitted to the vehicle wheels through the steering shaft 12, the shank 30, the cage 23 integral with the shank 30, the pin 37, the inner member 22, the pinion shaft 17, the pinion 19 and the rack 18. Owing to the resistance of the vehicle wheels, the steering shaft 12 is subjected to a torque. The sensor 14 detects the torque of the steering shaft 12 to actuate the motor 15 through the control unit 13. The driving force of the motor 15 is applied to the outer member 21 of the clutch 20 through the reduction unit 16 so as to turn the outer member e.g. in the direction of arrow C of FIG. 4, that is, to the lefthand side.

The rolling elements 24 at the lefthand side of FIG. 4 are thus pushed by the spring 25 into the narrow area of the wedge space 28, thus locking together the outer member 21 and the inner member 22. The driving force of the motor 15 is now transmitted to the inner member 22 from the outer member 21 and then to the vehicle wheels through the pinion shaft 17 coupled to the inner member 22, the pinion 19 and the rack 18. Thus, the vehicle wheels can be controlled by turning the steering wheel 11 with a very small steering force.

If the driving system including the control unit 13, the motor 15 and the reduction unit 16 should fail, when the steering wheel 11 is turned, the cage 23 coupled to the steering shaft 12 is turned, but the outer member 21 coupled to the driving system will not turn. As a result, as shown in FIG. 5, the cage 23 turns with respect to the outer member 21 so as to fill the clearance B formed in the direction of rotation. The rolling element 24' at the righthand side will be pushed to the left against the bias of the spring 25, so that the outer member 21 will be unlocked from the inner member 22. As the cage 23 is further turned to the left, the wall of the hole 39 gets into abutment with the pin 37. Now the torque of the cage 23 is transmitted to the inner member 22 through the pin 37 and to the vehicle wheels through the pinion shaft 17, the pinion 19 and the rack 18.

It will be understood that if the driving system fails, the manual steering force required will not be excessive to control the vehicle wheels. This is because the steering wheel is disconnected from the driving system.

FIG. 6 shows the second embodiment in which a clutch 50 has an outer member 51 integrally formed on its outer periphery with a gear 51' adapted to mesh with the output gear of the reduction unit 16. A cage 53 has a polygonal inner periphery 69 analogous in shape to a polygonal outer surface 56 of an inner member 52. A clearance A is formed in the direction of rotation between the inner periphery 69 of the cage 53 and the outer periphery 56 of the inner member 52. Clearances B are formed in the direction of rotation between roller elements 54 and 54' and the side wall of the pocket-shaped space of the cage 53. The roller elements are biassed by a spring 55 away from each other. As in the first embodiment, the clearance A is larger than the clearances B. Elastic pieces 68 made of e.g. rubber are provided between the polygonal inner periphery 69 and the polygonal outer periphery 56 so as to absorb the shock when the former gets into abutment with the latter and thus to improve the steering feeling. Otherwise, this embodiment is the same in construction and operation as the first embodiment.

Figure 7:
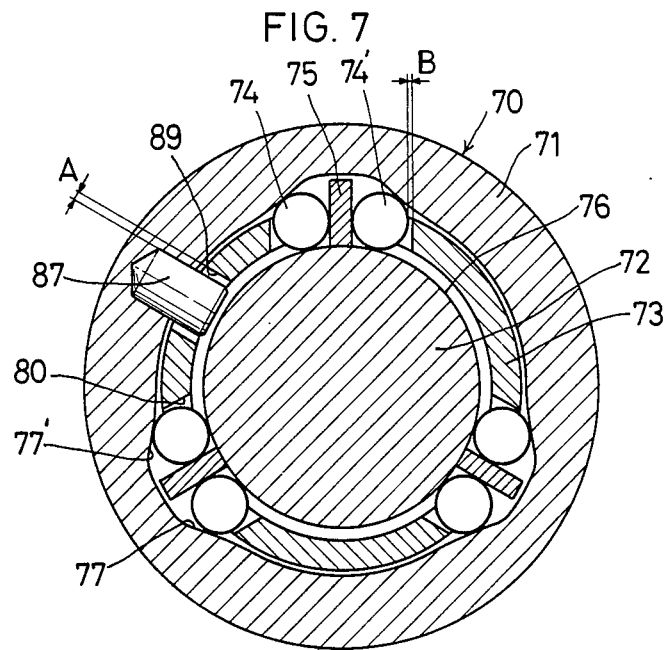
FIG. 7 is a similar view of the third embodiment.
Figure 8:
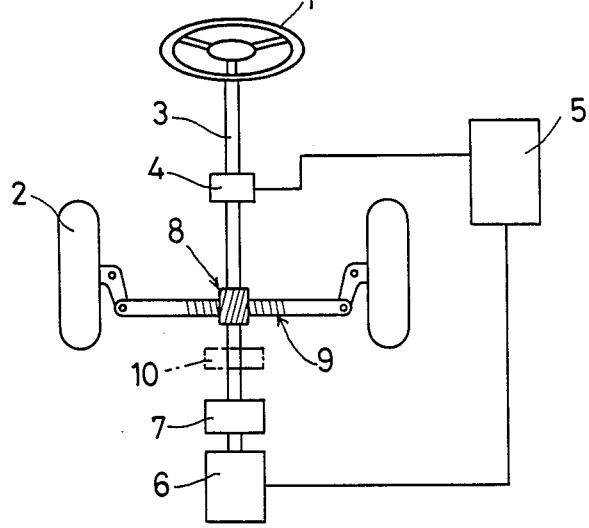
FIG. 8 is a schematic view of a prior art electric power steering assembly.

FIG. 7 shows the third embodiment, that is, a clutch 70 in which an outer member 71 is formed on its inner periphery with cam surfaces 77 and 77' and an inner member 72 has a cylindrical outer peripheral surface 76. Namely, in this embodiment, the cam surfaces 77, 77' and the cylindrical surface 76 are arranged in an opposite way to those in the first embodiment. A pin 87 is fixedly mounted in the outer member 71 and has its other end loosely received in a hole 89 formed in a cage 73 with a clearance A left therebetween in the direction of rotation. Clearances B are formed between the wall surfaces 80 of the pocket-shaped spaces on the cage 73 and the rolling elements 74 and 74'. A spring 75 is put between the rolling elements 74, 74'.

The clearance A is larger than the clearances B as in the first embodiment. When using the clutch of the third embodiment in an electric power steering assembly, the outer member 71 is coupled to the pinion shaft 17, the inner member 72 to the reduction unit 16, and the cage 73 to the steering shaft 12.

What is claimed is:
1. A clutch, comprising:
an outer member;
an inner member mounted in said outer member;
one of said outer member and said inner member being formed with a cam surface and the other being formed with a cylindrical surface;
a cage interposed between said outer member and said inner member and formed with a plurality of pockets angularly spaced from one another;
a plurality of pairs of rolling elements mounted in each of said pockets;

a plurality of wedge-like spaces defined by the inner peripheral surface of said outer member and the outer peripheral surface of said inner member, and wherein walls of said pockets being formed in said cage;

a spring mounted in each of said pockets between said pair of rolling elements so as to bias said rolling elements away from each other into said wedge-like spaces; and means for causing said cage to engage said one member formed with a cam surface with a first clearance in the direction of rotation, wherein said one member formed with a cam surface being adapted to be brought into engagement with said other member formed with a cylindrical surface through only one rolling element of each of said pairs of rolling elements when said cage moves with respect to said one member formed with a cam surface, wherein a second clearance is formed between said rolling element and said wall of said pocket in the direction of rotation, wherein said first clearance is larger than said second clearance, wherein at least one of said inner member and said outer member which is formed with a cylindrical surface is drivingly connected to a first driving means, wherein said cage is drivingly connected to a second driving means, and wherein said one member formed with a cam surface is connected to a driven unit.

2. A clutch as claimed in claim 1, wherein said outer member has a cylindrical inner peripheral surface, said inner member having a polygonal cam surface on outer periphery thereof.

3. A clutch as claimed in claim 1, wherein said outer member has a cylindrical inner peripheral surface, said inner member having a polygonal cam surface on the outer periphery thereof, and said cage having a polygonal inner surface of a shape corresponding to the polygonal cam surface on said inner member.

4. A clutch as claimed in claim 1, wherein said outer member has cam surfaces on inner periphery thereof, said inner member having a cylindrical outer peripheral surface.

* * * * *